US012741219B2

(12) United States Patent
Bean

(10) Patent No.: US 12,741,219 B2
(45) Date of Patent: Sep. 22, 2026

(54) SYSTEMS AND METHODS FOR FACILITATING PRIVATE COMMUNICATION BETWEEN USERS

(71) Applicant: Sony Interactive Entertainment Inc., Tokyo (JP)

(72) Inventor: Celeste Bean, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 313 days.

(21) Appl. No.: 18/120,347

(22) Filed: Mar. 10, 2023

(65) Prior Publication Data

US 2024/0299855 A1 Sep. 12, 2024

(51) Int. Cl.

*A63F 13/87* (2014.01)
*A63F 13/825* (2014.01)
*G06F 3/01* (2006.01)

(52) U.S. Cl.

CPC ............ *A63F 13/87* (2014.09); *A63F 13/825* (2014.09); *G06F 3/017* (2013.01)

(58) Field of Classification Search

None
See application file for complete search history.

(56) References Cited

U.S. PATENT DOCUMENTS 8,209,041 B2 * 6/2012 Beeman ................ A63F 13/533 700/90
8,219,616 B2 * 7/2012 Dawson .................. H04L 51/04 709/205
8,308,573 B2 * 11/2012 McKenna ............... A63F 13/31 463/40
8,777,746 B2 * 7/2014 Watkins, Jr. ........ A63F 13/2145 463/37
10,795,449 B2 * 10/2020 Faaborg .................. G06F 3/013
10,817,066 B2 * 10/2020 Ross ..................... H04L 67/131
11,908,086 B2 * 2/2024 Rothkopf ................ G06F 3/013
11,935,170 B1 * 3/2024 Jain ........................ G06V 40/28
2009/0303984 A1 * 12/2009 Clark .................... H04L 63/104 370/352

(Continued)

OTHER PUBLICATIONS

PCT/US2024/017153 Notification of Transmittal of the International Search Report and the Written Opinion of the International Searching Authority, or the Declaration, PCT/ISA/220, and the International Search Report, PCT/ISA/210, Jun. 13, 2024.

*Primary Examiner* — Seng H Lim

(74) *Attorney, Agent, or Firm* — Kilpatrick Townsend & Stockton LLP

(57) ABSTRACT

Systems and methods for facilitating private communication between users are described. One of the methods includes determining that a gesture directed towards one or more users from a plurality of users is made by a user, generating one or more private communication channels between the user and the one or more users in response to determining that the gesture is directed towards the one or more users, and determining that one or more additional gestures indicated in the one or more private communication channels are made. The one or more additional gestures are associated with one or more meanings, and the one or more meanings are received via the one or more private communication channels. The method includes hiding the one or more additional gestures from remaining ones of the plurality of users.

17 Claims, 6 Drawing Sheets

( Gesture to Open Private Channel)

(56) References Cited

U.S. PATENT DOCUMENTS

| | | | | |
|---|---|---|---|---|
| 2010/0285875 | A1* | 11/2010 | McKenna | A63F 13/31<br>463/31 |
| 2011/0298827 | A1* | 12/2011 | Perez | G06V 40/28<br>345/647 |
| 2011/0301934 | A1* | 12/2011 | Tardif | G06F 40/45<br>382/103 |
| 2014/0237392 | A1* | 8/2014 | Hoomani | A63F 13/847<br>715/757 |
| 2017/0324841 | A1* | 11/2017 | Clement | A63F 13/573 |
| 2018/0107835 | A1* | 4/2018 | Clement | A63F 13/212 |
| 2018/0157333 | A1* | 6/2018 | Ross | G06F 3/013 |
| 2018/0159841 | A1* | 6/2018 | Toff | G06F 3/011 |
| 2019/0391637 | A1* | 12/2019 | Taylor | G06F 3/013 |
| 2021/0339151 | A1* | 11/2021 | Stafford | A63F 13/655 |
| 2022/0191157 | A1* | 6/2022 | Lee | H04L 51/063 |
| 2022/0362680 | A1* | 11/2022 | Stafford | A63F 13/23 |
| 2024/0089407 | A1* | 3/2024 | Fisher-Stawinski | H04N 7/157 |
| 2025/0071157 | A1* | 2/2025 | Powell | G06F 3/0482 |

* cited by examiner

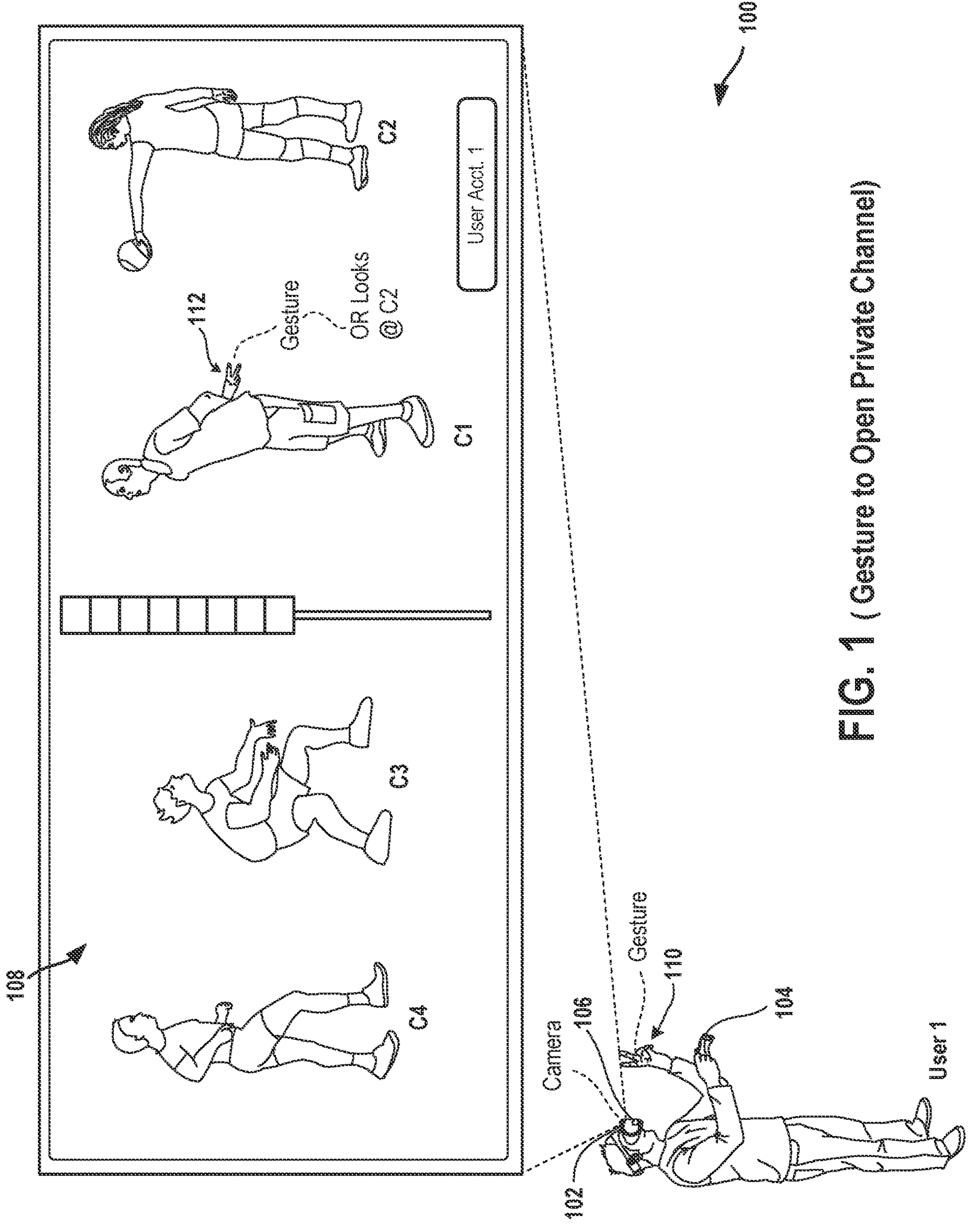
FIG. 1 (Gesture to Open Private Channel)

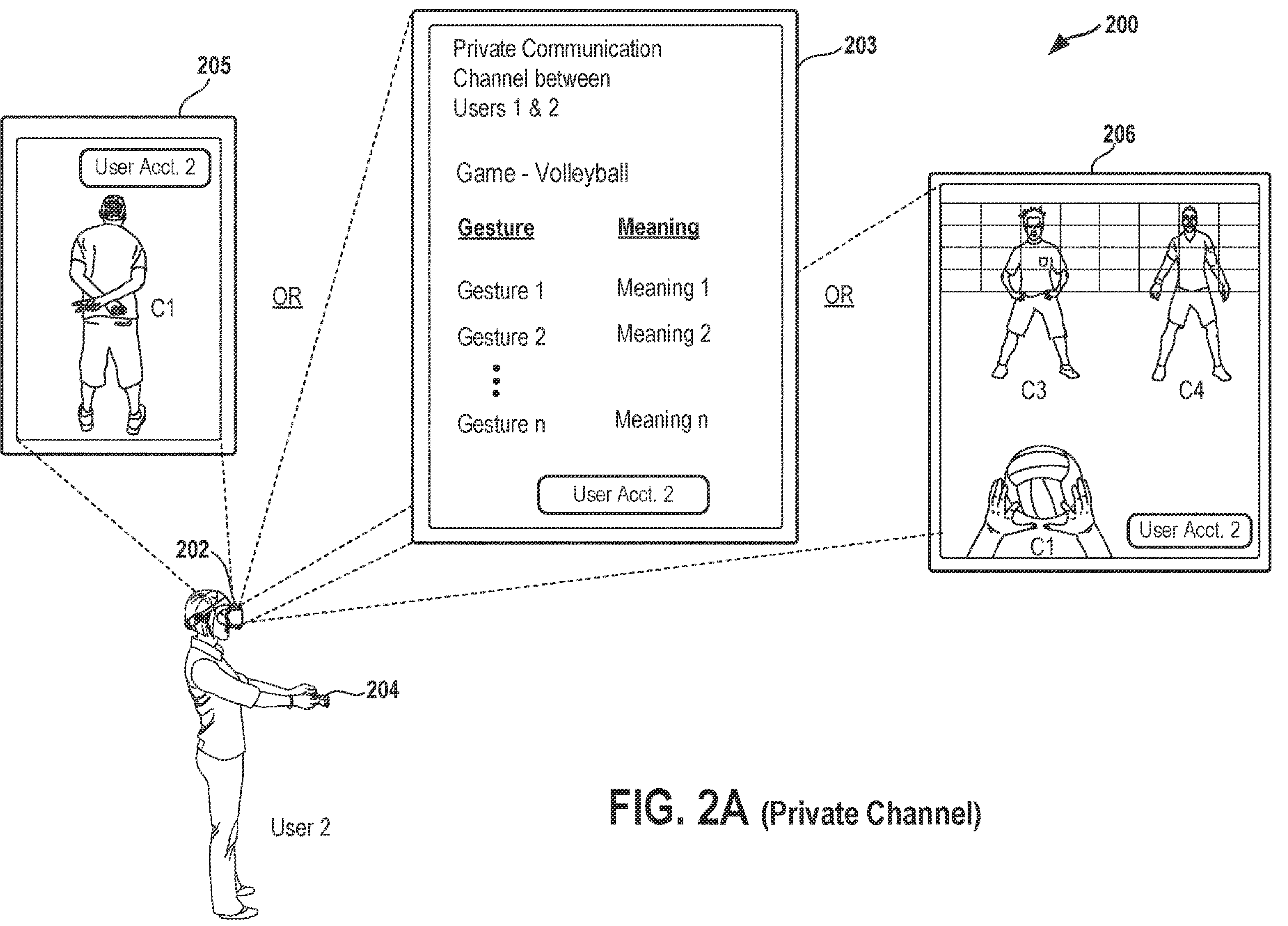
FIG. 2A (Private Channel)

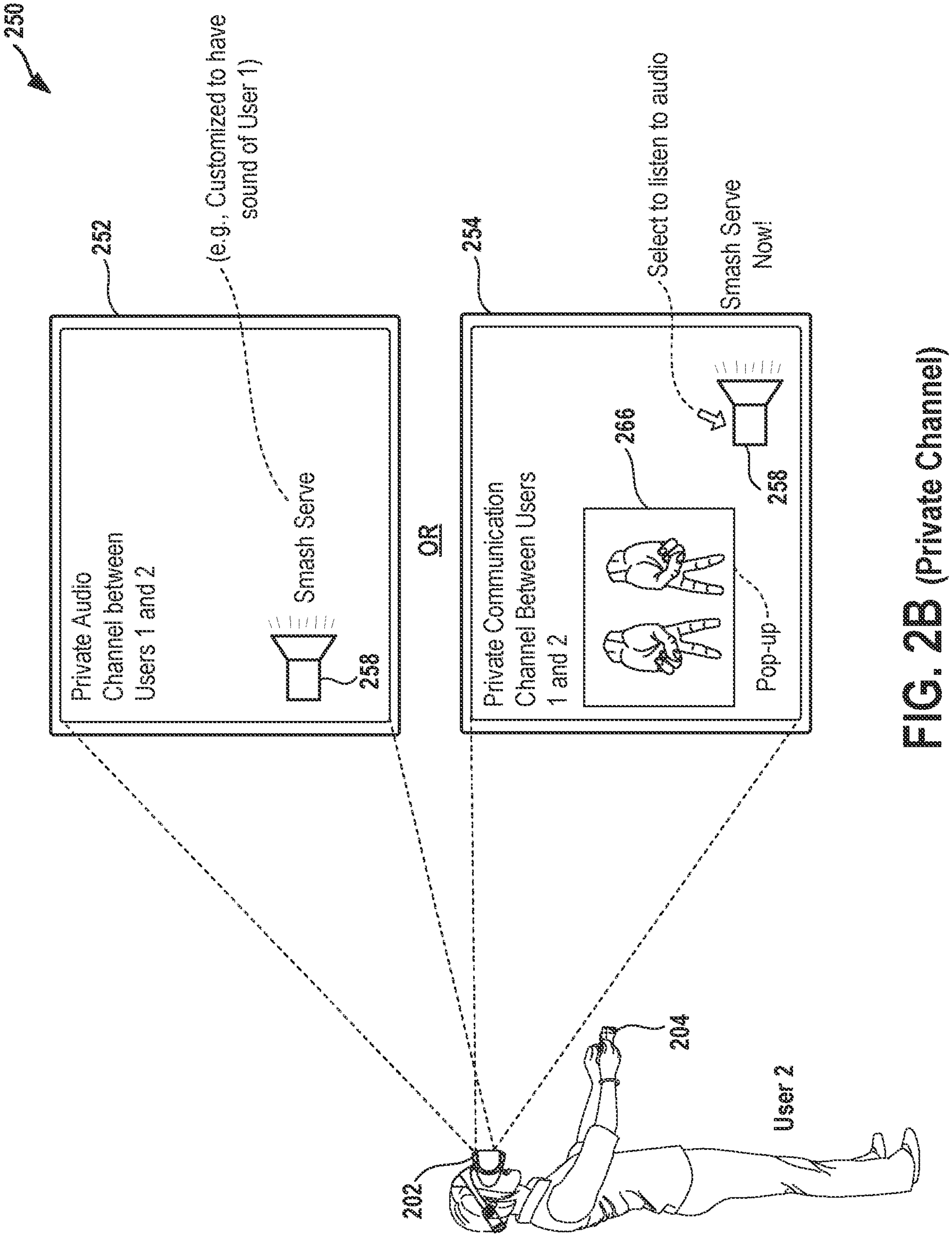
FIG. 2B (Private Channel)

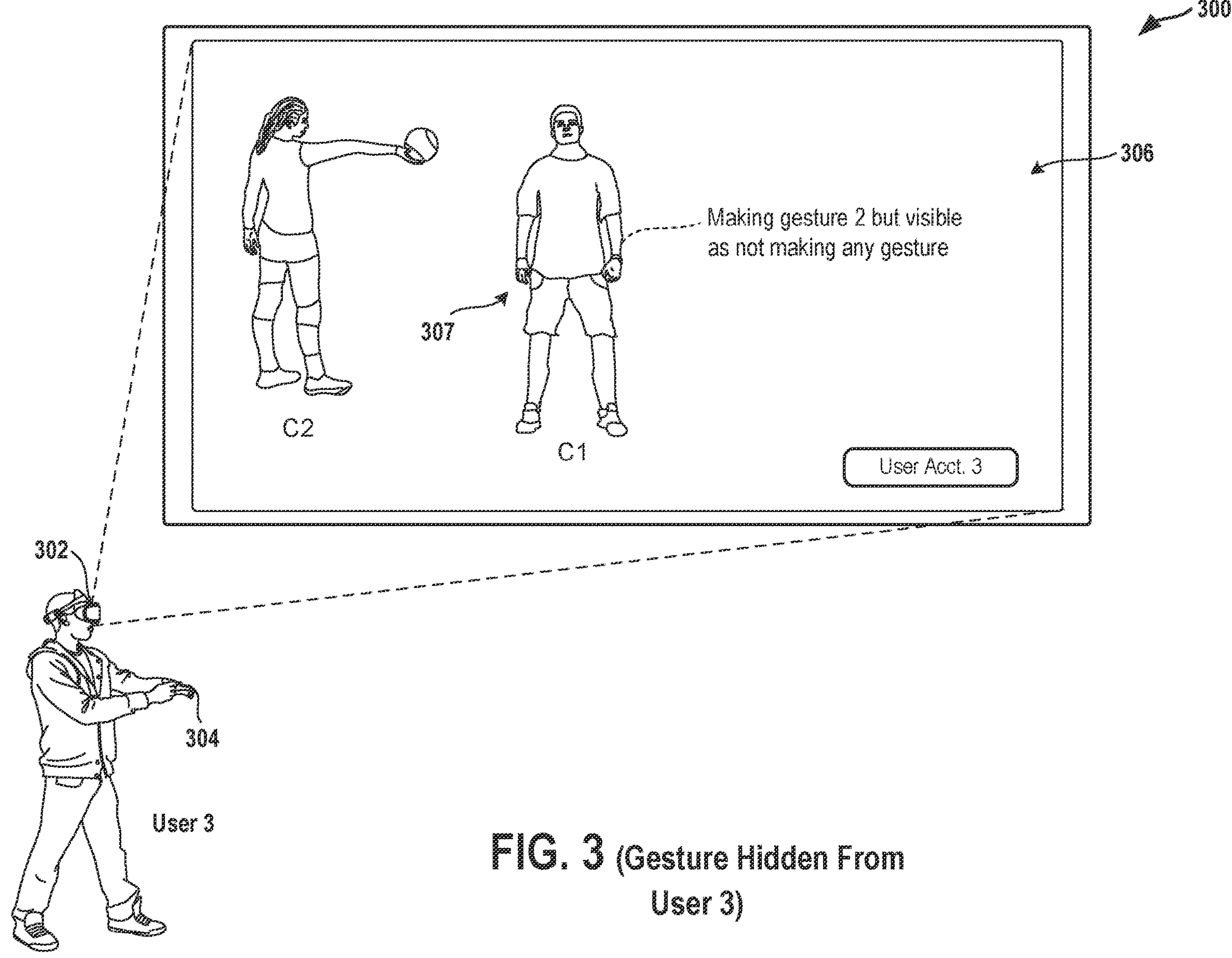
FIG. 3 (Gesture Hidden From User 3)

SYSTEMS AND METHODS FOR FACILITATING PRIVATE COMMUNICATION BETWEEN USERS

FIELD

The present disclosure relates to systems and methods for facilitating private communication between users are described.

BACKGROUND

The advent of the Internet has not only revolutionized global communications, but it has also revolutionized the way that people play video games. Video games have evolved to take advantage of the nearly instantaneous global communications provided by the Internet in order to provide rich multiplayer online gaming experiences where players from all over the world compete and/or interact with one another. Players experience a synchronized game environment where they can play the same game at the same time regardless of their individual geographic locations. Some online multiplayer games can support from hundreds to thousands of concurrent users playing the same game at the same time.

It is in this context that embodiments of the invention arise.

SUMMARY

Embodiments of the present disclosure provide systems and methods for facilitating private communication between users.

In an embodiment, methods for capturing signals created by real-world gestures, such as sign communications of a sign language, are described. One or more of the gestures trigger a private channel for communicating strategy between players during a play of a video game. As an example, the sign communications can be associated with a virtual gesture that is identified and associated with predefined communication information. The communication information can be strategic for the video game, and the virtual gesture is not visible to other players. Other players see a different virtual gesture or the virtual gesture May be hidden from other players. For instance, when a player wishes to communicate with another player via a real-world gesture to signal a strategy move, a virtual gesture is identified based on a relationship between the real-world gesture and the virtual gesture, and the communication is transferred and output to a target receiver of the strategy move. To other players, the virtual gesture appears to be normal sign language or hand movements without meaning.

In one embodiment, a method for facilitating private communication between users is described. The method includes determining that a gesture directed towards one or more users from a plurality of users is made by a user, generating one or more private communication channels between the user and the one or more users in response to determining that the gesture is directed towards the one or more users, and determining that one or more additional gestures indicated in the one or more private communication channels are made. The one or more additional gestures are associated with one or more meanings, and the one or more meanings are received via the one or more private communication channels. The method includes hiding the one or more additional gestures from remaining ones of the plurality of users.

In an embodiment, a server system is described. The server system includes a processor and a memory device. The processor determines that a gesture directed towards one or more users from a plurality of users is made by a user, generates one or more private communication channels between the user and the one or more users in response to determining that the gesture is directed towards the one or more users, and determines that one or more additional gestures indicated in the one or more private communication channels are made. The one or more additional gestures are associated with one or more meanings, and the one or more meanings are received via the one or more private communication channels. The processor hides the one or more additional gestures from remaining ones of the plurality of users.

In one embodiment, a non-transitory computer-readable medium containing program instructions for facilitating private communication between users is described. Execution of the program instructions by one or more processors of a computer system causes the one or more processors to carry out multiple operations. The operations include determining that a gesture directed towards one or more users from a plurality of users is made by a user, generating one or more private communication channels between the user and the one or more users in response to determining that the gesture is directed towards the one or more users, and determining that one or more additional gestures indicated in the one or more private communication channels are made. The one or more additional gestures are associated with one or more meanings, and the one or more meanings are received via the one or more private communication channels. The operations include hiding the one or more additional gestures from remaining ones of the plurality of users.

Some advantages of the herein described systems and methods include enabling private communication between two users during execution of a computer program, such as a video game computer program or a sign language computer program. For example, during the execution of the computer program, a first user desires to communicate with a second user without a third user finding out about the communication. In the example, the communication is hidden from the third user.

Further advantages of the herein described systems and methods include providing a private communication channel between client devices operated by two users to receive a listing of virtual gestures and their meanings. After the listing is received, the users can communicate with each other by controlling virtual characters to perform the virtual gestures to communicate the meanings to each other.

Additional advantages of the herein described systems and methods include providing a seamless private communication between two users. For example, once a private communication channel having a listing of virtual gestures and their meanings is established between client devices operated by the users, the users do not need to continuously provide textual descriptions to communicate with each other. Rather, the users can control virtual characters to communicate with each other while hiding the communication from other users.

Other aspects of the present disclosure will become apparent from the following detailed description, taken in conjunction with the accompanying drawings, illustrating by way of example the principles of embodiments described in the present disclosure.

BRIEF DESCRIPTION OF THE DRA WINGS

Various embodiments of the present disclosure are best understood by reference to the following description taken in conjunction with the accompanying drawings in which:

FIG. 1 is a diagram of an embodiment of a system to illustrate a gesture performed by a user to open a private communication channel between the user and one or more other users.

FIG. 2A is a diagram of an embodiment of a system to illustrate generation of one or more private communication channels between multiple users during a play of a video game.

FIG. 2B is a diagram of an embodiment of a system to illustrate private multimedia channels displayed on a head-mounted display.

FIG. 3 is a diagram of an embodiment of a system to illustrate that one or more additional virtual gestures made by a virtual character are hidden from a first user after an occurrence of a private communication channel between second and third users.

DETAILED DESCRIPTION

Figure 4:
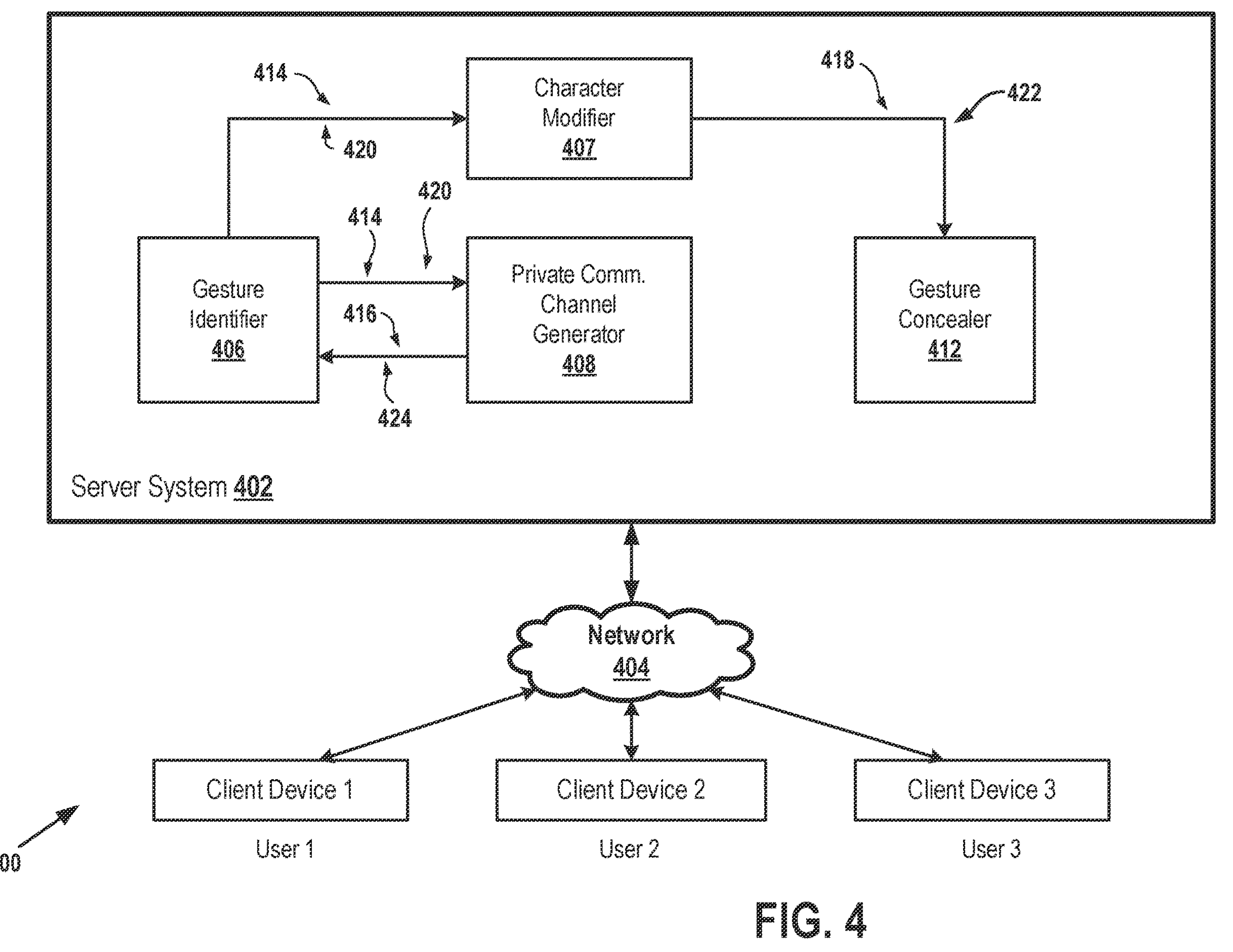
FIG. 4 is a diagram of an embodiment of a system to illustrate components of a server system.

Systems and methods for facilitating private communication between users are described. It should be noted that various embodiments of the present disclosure are practiced without some or all of these specific details. In other instances, well known process operations have not been described in detail in order not to unnecessarily obscure various embodiments of the present disclosure.

FIG. 1 is a diagram of an embodiment of a system 100 to illustrate a gesture performed by a user 1 to open a private communication channel between the user 1 and one or more other users. The system 100 includes a head-mounted display (HMD) 102 and a hand-held controller 104. The HMD 102 includes an inside-out camera 106 that faces a real-world environment in front of the user 1 to have a field-of-view of the real-world environment. The HMD 102 is worn by the user 1, and the hand-held controller 104 is held by the user 1 to operate the hand-held controller 104.

The user 1 accesses, via a computer network, a user account 1 that is assigned to the user 1 by a server system to access a virtual scene 108 of a video game, such as an outdoor volleyball video game. As an example, the server system includes one or more servers that execute one or more computer programs, such as a video game program or a sign language program or a language translation program or a video teleconference program, to generate one or more images. An example of the sign language program is an American Sign Language (ASL) program. Each server includes one or more processors and one or more memory devices. The one or more processors of the server are coupled to the one or more memory devices of the server. Examples of the computer network include a local area network, such as an Intranet, and a wide area network, such as the Internet.

After the user 1 is logged into the user account 1, the one or more processors of the server system generate multiple image frames of the virtual scene 108 and send the image frames via the computer network to a client device operated by the user 1. For example, the image frames of the virtual scene 108 are sent to the HMD 102. An example of the client device includes a combination of the HMD 102 and the hand-held controller 104. One or more processors of the HMD 102 received the image frames for generating the virtual scene 108 and display the virtual scene 108 on one or more display screens of the HMD 102.

In the virtual scene 108, there are multiple virtual characters C1, C2, C3, and C4. The user 1 controls the virtual character C1 via the hand-held controller 104 or by making one or more real-world gestures or a combination thereof to play the video game. The remaining virtual characters C2, C3, and C4 are controlled by other users to play the video game. During a play of the video game, the user 1 makes a real-world gesture 110 using his/her hands. For example, the user 1 makes the real-world gesture 110 of a peace sign by extending his/her index and middle fingers of his/her left hand. The camera 106 captures the real-world gesture 110 to generate one or more images of the real-world gesture 110. The one or more images of the real-world gesture 110 are sent from the camera 106 via the computer network to the server system.

The one or more processors of the server system analyze the images of the real-world gesture 110 to identify the real-world gesture 110 as being associated with a virtual gesture 112 to be made by the virtual character C1 and to open a private communication channel between the client device operated by the user 1 and a client device operated by a user 2 (FIG. 2A). For example, the one or more processors of the server system determine that in response to receiving image data indicating the real-world gesture 110 via the computer network, the private communication channel between the client device operated by the user 1 and the client device operated by the user 2 is to be opened and simultaneously the virtual character C1 is to be controlled to make the virtual gesture 112 directed towards the virtual character C2. To illustrate, the one or more processors of the server system access a user profile of the user 1 from the one or more memory devices of the server system to identify a correspondence, such as a unique or one-to-one relationship, between the virtual gesture 112 to be made by the virtual character C1 towards the virtual character C2 and the real-world gesture 110, and based on the correspondence, determines that the virtual character C1 is to be controlled to make the virtual gesture 112 towards the virtual character C2. An example of the virtual gesture 112 is a set of sub-gestures, which include movement of hands of the virtual character C1 behind its back to be directed towards the virtual character C2 and making a peace sign with its index and middle fingers. Another example of the virtual gesture 112 is a set of sub-gestures, such as turning of the virtual character C2 to look at the virtual character C1 followed by movement of hands of the virtual character C1 behind its back to be directed towards the virtual character C2, further followed by making a peace sign with its index and middle fingers.

In the virtual scene 108, during a time period in which the virtual character C2 is about to serve using a virtual volleyball, the virtual character C1 makes the virtual gesture 112 directed towards the virtual character C2. For example, the virtual character C1 moves its hands behind its back and creates a peace sign using its right hand to direct the peace sign towards the virtual character C2 and not towards the virtual characters C3 and C4. It should be noted that the virtual characters C1 and C2 are in one team of the video game and the virtual characters C3 and C4 are in an opposite team of the video game.

In an embodiment, instead of the real-world gestures for playing the outdoor volleyball game, sign language gestures, such as ASL gestures or gestures of languages of another country, are made by the user 1, during execution of the sign language program, to privately communicate with the user 2 or another user.

In one embodiment, instead of the HMD 102, another display device, such as a desktop monitor, a television, a smart television, a tablet, and a smart phone, is used. In the embodiment, a combination of the other display device and a hand-held controller, such as the hand-held controller 104, is an example of a client device.

In an embodiment, a user does not hold a hand-held controller in his/her hands. For example, the user 1 makes real-world gestures using his/her hands and does not have a hand-held controller. As another example, the user 1 wears gloves and makes the real-world gestures, or wears other types of controllers, such as ring-shaped controllers or wrist band controllers, and makes the real-world gestures.

In one embodiment, instead of the virtual scene 108 of the video game, one or more images of another one of the one or more computer programs are generated.

In an embodiment, the remaining virtual characters C2, C3, and C4 are controlled by an artificial intelligence (AI) model or by a combination of the other users and the AI model.

In one embodiment, instead of or in addition to the real-world gesture 110, one or more real-world gestures are made by the user 1 to control the virtual character C1 to make the virtual gesture 112. For example, instead of making the real-world gesture 110, the user 1 winks his/her left eye to control the virtual character C1. In the example, the winking is an example of a real-world gesture. In the example, the HMD 102 includes a camera that faces eyes of the user 1 to capture images of the eyes of the user 1. In the example, the images are sent from the camera via the computer network to the server system, and the one or more processors determine the virtual gesture 112 based on the images in the same manner in which the virtual gesture 112 is determined based on the image data of the real-world gesture 110. As another example, instead of the real-world gesture 110, the user 1 claps his/her hands. In the example, the clapping of hands is a real-world gesture.

In an embodiment, instead of or in addition to the virtual gesture 112, the virtual character C1 is controlled by the one or more processors of the server system to make one or more virtual gestures in response to the reception of the image data indicating the real-world gesture 110. For example, instead of making the virtual gesture 112, the virtual character C1 looks at the virtual character C2 and winks his/her left eye. In the example, the look in the direction of the virtual character C2 and the winking of the left eye of the virtual character C1 are virtual gestures directed towards the virtual character C2. As another example, instead of the virtual gesture 112, the character C1 moves its hand behind its back and claps its hands. In the example, the movement of the hands behind the back and clapping of hands of the character C1 are virtual gestures.

In one embodiment, a computing device, such as a game console, is used in addition to an HMD, such as the HMD 102, and a hand-held controller, such as the hand-held controller 104. In the embodiment, a combination of the computing device, the HMD and the hand-held controller is an example of a client device. The computing device is coupled to the HMD and the hand-held controller for transferring images received from a camera of the HMD and input data received from the hand-held controller via the computer network to the server system. Also, the computing device transfers image frames of a virtual scene, such as the virtual scene 108, received from the server system to the HMD for display.

In an embodiment, instead of the volleyball video game, any other videogame, such as a football video game, a soccer video game, a sports video game, or a fighting video game, is used.

In one embodiment, the one or more images of the real-world gesture 110 are captured by outside-in cameras that are placed in the real-world environment of the user 1. For example, a camera is placed on top of a television to capture the one or more images of the real-world gesture 110. In the embodiment, a client device includes a combination of the outside-in cameras, the HMD 102 and the hand-held controller 104.

In an embodiment, a camera that faces eyes of the user 1 captures image data of a gaze of eyes of the user 1 to determine whether the user 1 is making a real-world gesture, such as the gaze, directed towards, such as looking at, the virtual character C2. The camera is located on the HMD 102 to face the eyes of the user 1 or in the real-world environment to face the user 1 to capture the image data of the gaze. The image data of the gaze is analyzed in the same manner in which the image data of the real-world gesture 110 is analyzed by the one or more processors of the server system to control the virtual character C1 based on the gaze in the same manner in which the character C1 is controlled based on the real-world gesture 110.

In one embodiment, the virtual gesture 112 is directed towards multiple virtual characters controlled by multiple users. For example, in case of an indoor volleyball video game, the virtual gesture 112 is directed towards the remaining five virtual characters in the same team as that of a virtual character making the virtual gesture 112. In the example, the five virtual characters are standing slightly behind the virtual character C1 to have a virtual line of sight to the virtual gesture 112.

In an embodiment, in case of the indoor volleyball video game, the one or more processors of the server system determine that the virtual character C1 is controlled by the user 1 via the hand-held controller 104 and/or using one or more real-world gestures to turn its body towards, such as in a first direction of, a first set of virtual characters, then moves its hands behind its back, and then make a peace sign with fingers of one of the hands to determine that a virtual gesture is directed towards the first set of virtual characters. Further, in the embodiment, upon determining that the body is turned towards the first set instead of towards, such as in a second direction of, a second set of virtual characters, the one or more processors of the server system determine that the virtual character C1 is controlled by the user 1 via the hand-held controller 104 to not direct the virtual gesture towards the second set of virtual characters. In the example, the first set of virtual characters, the second set of virtual characters, and the virtual character C1 belong to the same team. In the example, by determining that the virtual gesture is directed towards the first set of virtual characters controlled by a first set of users via a first set of hand-held controllers and not towards the second set of virtual characters controlled by a second set of users via a second set of hand-held controllers, the one or more processors of the server system determine that the one or more real-world gestures are directed towards the first set of users and not towards the second set of users.

In one embodiment, the one or more processors of the server system determine that in response to receiving image data indicating the real-world gesture 110 via the computer network, the private communication channel between the client device operated by the user 1 and a client device operated by the user 2 is to be opened without simultaneously controlling the virtual character C1 to make the virtual gesture 112 directed towards the virtual character C2. For example, the private communication channel is opened, such as generated, initially. In the example, after the private communication is opened, the virtual gesture 112 listed as one of gestures, such as a gesture 1, described below, in the private communication channel is generated as being performed by the virtual character C1 in the virtual scene 108 based on the real-world gesture 110 or another real-world gesture performed by the user 1.

FIG. 2A is a diagram of an embodiment of a system 200 to illustrate generation of one or more private communication channels, such as a private communication channel 203, a private communication channel 205, and a private communication channel 206, between the user 1 and the user 2 during a play of the video game. The system 200 includes an HMD 202 and a hand-held controller 204. The HMD 202 is worn by the user 2 and the hand-held controller 204 is held by the user 2 to operate the hand-held controller 204.

The user 2 accesses the video game via the computer network after logging into a user account 2 assigned to the user 2. For example, the user 2 uses the hand-held controller 204 to control the virtual character C2 to play the video game with the user 1. Upon controlling the virtual character C1 to make the virtual gesture 112 (FIG. 1) in the virtual scene 108 (FIG. 1), the one or more processors of the server system generate one or more of the private communication channels 203, 205, and 206 to be displayed on one or more displays screens of the HMD 202 or on the HMD 102 or both the HMDs 202 and 102. For example, the one or more processors of the server system generate channel data, such as image data or audio data or a combination thereof, for displaying the private communication channel 203 or 205 or 206 or a combination of two or more thereof and send the channel data via the computer network to the HMD 202. An example of the channel data is user interface data, such as image data, to display the private communication channel 203, such as a user interface, for enabling communication of information, such as gestures and their meanings, between the virtual characters C1 and C2. An example of the private communication channel 203 is one or more images. Another example of the channel data is user interface data, such as image data, to display the private communication channel 205, such as a zoom-in window, for enabling the user 2 to clearly view the virtual gesture 112 (FIG. 1) by the virtual character C1 during the play of the video game. The zoom-in window is an example of a user interface and includes such as one or more images. Yet another example of the channel data is user interface data, such as image data, to display the private communication channel 306, such as a standpoint window, for enabling the user 2 to view the video game from the standpoint of a view of the virtual character C1. To illustrate, the standpoint window includes the same virtual scene of the video game as that displayed on the HMD 102 (FIG. 1) to the user 1. The standpoint window is an example of a user interface. Additional examples of the channel data are provided below. The standpoint window includes one or more images.

One or more processors of the HMD 202 operated by the user 2 receive the channel data from the server system via the computer network and display one or more private communication channels on the one or more display screens of the HMD 202. For example, the one or more processors of the HMD 202 render the private communication channel 203 overlaid on a display of a virtual scene of the video game displayed on the HMD 202. In the example, the private communication channel 203 includes a name of the video game that is played by the users 1 and 2, and a table including fields for receiving a listing, such as textual descriptions or images, of one or more gestures 1 through n and one or more of meanings 1 through n of the one or more gestures 1 through n, where n is a positive integer. In the example, the user 1 (FIG. 1) uses the hand-held controller 104 (FIG. 1) to provide the listing, which is simultaneously displayed on both the HMDs 102 and 202. In the example, the gestures 2 through n are examples of additional virtual gestures that can be made when the user 1 controls the virtual character C1 by making real-world gestures. To illustrate, the private communication channel 203 includes a field for receiving an image of the virtual gesture 112, which is an example of the gesture 1, and a field for receiving a textual description that the gesture 1 means to serve a spike serve. In the illustration, the private communication channel 203 includes a field for receiving an image of the gesture n, and a field for receiving a textual description that the gesture n means to play more defense rather than offense after serving the spike serve.

As another example, the one or more processors of the server system accesses the listing of one or more of the gestures 1 through n and one or more of the meanings 1 through n from the user profile stored within the user account 1 of the user 1 and sends the listing as the channel data via the computer network to the client device operated by the user 2 for display on the client device. In the example, the listing is accessed from the user 1's user profile stored within the one or more memory devices of the server system. As yet another example, the one or more processors of the server system access the gesture 1 and the meaning 1 from the user 1's user profile and sends the gesture 1 through n and the meaning 1 as the channel data via the computer network to the client device operated by the user 2 for display on the client device. In the example, the gesture 1 and the meaning 1 are accessed from the user profile of the user 1. In the example the user 1's user profile is stored in the server system.

As yet another example, the one or more processors of the HMD 202 display the private communication channel 203 to replace a display of a virtual scene of the video game displayed on the HMD 202. As still another example, the private communication channel 203 includes a table having the listing of the gestures 1 through n and meanings 1 through n of the gestures 1 through n. The one or more processors of the server system access the table from the user account 1 stored in the one or more memory devices of the server system, and send the table embedded within the channel data via the computer network to the client device operated by the user 2 for displaying the private communication channel 203. In the example, upon viewing the listing, the user 2 uses the hand-held controller 204 to generate a request for storing the table within the user account 2. Further, in the example, the client device operated by the user 2 sends the request via the computer network to the server system for storing the table within the user account 2. The user 2 can use the hand-held controller 204 to access the table during the same gaming session of the video game in which the virtual scene 108 is generated or during another gaming session of the video game.

As another example, the one or more processors of the HMD 202 render the zoom-in window overlaid on a display of a virtual scene of the video game displayed on the HMD 202. In the example, the zoom-in window includes a zoom-in of the virtual gesture 112 made by the virtual character C1. As yet another example, the one or more processors of the HMD 202 render the standpoint window as being overlaid on a display of a virtual scene of the video game displayed on the HMD 202. In the example, the standpoint window 212 includes hands of the virtual character C1 without including the remaining body portion of the virtual character C1.

It should further be noted that the gestures 1 through n and their meanings 1 through n are for a single game session of the video game or for multiple game sessions of the video game. For example, when the gestures 1 through n and their meanings 1 through n are for the single game session, the one or more processors of the server system do not store the gestures 1 through n and their meanings 1 through n within the user 1's user profile and a user profile of the user 2 for access by the users 1 and 2 via the HMDs 102 and 202 after the single game session. In the example, the user 2's user profile is stored within the user account 2, which is stored within the one or more memory devices of the server system. In the example, when the gestures 1 through n and their meanings 1 through n are to be used for the multiple game sessions, the one or more processors of the server system store the gestures 1 through n and their meanings 1 through n within the user 1's user profile and the user 2's profile for access by the users 1 and 2 via the HMDs 102 and 202 after the single game session. To illustrate, the one or more processors of the server system provide an option within the channel data to the user 1 via the user account 1 to receive an indication whether the gestures 1 through n and their meanings 1 through n are to be used for the single game session or multiple game sessions. In the illustration, the user 1 uses the hand-held controller 102 to provide the indication, which is sent from the client device operated by the user 1 via the computer network to the one or more processors of the server system.

In one embodiment, the one or more processors of the HMD 102 operated by the user 1 receive the channel data from the server system via the computer network and display one or more user interfaces on the one or more display screens of the HMD 102 in the same manner in which the one or more processors of the HMD 202 operated by the user 2 received the channel data and display one or more user interfaces on the one or more display screens of the HMD 202.

In an embodiment, the one or more processors of the server system do not allow receipt of the gestures 2 through n and the meanings 2 through n from the client device operated by the user 2. For example, the one or more processors of the server system disable the private communication channel 203 from receiving channel data identifying a gesture and its meaning from the client device operated by the user 2 via the user account 2 and the computer network.

FIG. 2B is a diagram of an embodiment of a system 250 to illustrate a private multimedia channel 252 and a private multimedia channel 254 displayed on the HMD 202 or 102 (FIG. 1) or both the HMDs 102 and 202. Each of the private multimedia channel 252 and the private multimedia channel 254 is an example of a private communication channel. The system 250 includes the HMD 202 and the hand-held controller 204.

Simultaneously with or before controlling the virtual character C1 to make the virtual gesture 112 (FIG. 1) in the virtual scene 108 (FIG. 1), upon receiving the image data indicating the real-world gesture 110 (FIG. 1), the one or more processors of the server system generate channel data for displaying one or more of the channels 252 and 254 on the HMD 202 or on the HMD 102 or a combination thereof. The one or more processors of the HMD 202 or 102 receive the channel data from the server system via the computer network and process, such as render or output, the channel data to display the channel 252 or 254 on the HMD. For example, the one or more processors of the server system generate the channel data for displaying the channel 252 or 254 or a combination thereof and send the channel data via the computer network to the HMD 202. An illustration of the channel data is user interface data and audio data to output, such as display or provide access to, the private multimedia channel 252 for enabling communication of information, such as gestures and their meanings, between the virtual characters C1 and C2. In the example, the private multimedia channel 252 has an image 258 of a speaker. Further, in the example, when the user 2 uses the hand-held controller 204 to select the image 258 of the speaker, the one or more processors of the client device operated by the user 2 process the audio data, such as amplify the audio data, and provide the processed audio data to one or more speakers of the client device operated by the user 2. In the example, the one or more speakers convert the audio data from an electrical signal to sound waves of sounds. In the example, the sounds indicate that the virtual character C2 (FIG. 1) is to be controlled by the user 2 to make the spike serve in response to the virtual gesture 112. To illustrate, the one or more processors of the server system receive a first set of audio data generated based on sounds output by the user 1 during a play of the video game or additional video games. In the illustration, the first set of audio data is captured by one or more microphones of the client device operated by the user 1. Further, in the illustration, the one or more processors of the server system generate a second set of audio data based on sounds of the user 1 and provide the second set of audio data as the channel data via the computer network to the client device operated by the user 2. In the illustration, the one or more processors of the server system determine amplitudes and frequencies of the first set of audio data captured by one or more microphones of the client device and apply the same amplitudes and frequencies to generate the second set of audio data. Further, in the illustration, the second set of audio data has a different substance compared to the first set of audio data in that the second set of audio data has a term, such as "make a spike serve", providing the meaning 1 to, such as defining, the virtual gesture 112 and the first set of audio data is generated based on sounds, such as, "I won" or "great game". In the illustration, the first set of audio data is captured during the same gaming session, of the video game, during which the virtual scene 108 is generated or during another gaming session of the video game.

Another example of the channel data is user interface data and audio data to output, such as display or provide access to, the private multimedia channel 254 for enabling communication of information, such as gestures and their meanings, between the virtual characters C1 and C2. The private multimedia channel 254 has the image 258 of the speaker and an image 266 of the virtual gesture 112. In the example, when the user 2 uses the hand-held controller 204 to select the image 258 of the speaker, the one or more processors of the client device operated by the user 2 output the sounds in the manner described above. Moreover, in the example, the display of the images 258 and 266 simultaneously indicates to the user 2 that the sounds output when the image 258 is selected provides the meaning 1 of the virtual gesture 112.

After a private communication channel, such as the channel 203, or 204 or 206, or 252, or 254 is generated, during a further play of the video game, the user 1 makes one or more further real-world gestures and the camera 106 captures the one or more further real-world gestures to generate image data. The one or more processors of the client device operated by the user 1 send the image data via the computer network to the server system. The one or more processors of the server system determine, based on the image data, whether to control the virtual character C1 to perform one or more of the gestures 1 through n. For example, the one or more processors of the server system determine that there is a correspondence, such as a one-to-one relationship or a unique relationship or link, between a further real-world gesture made by the user 1 and the gesture n, and upon determining so, the one or more processors of the server system generate one or more image frames to control the virtual character C1 to make the gesture n.

Moreover, in the example, the one or more processors of the server system include, within the one or more image frames, further channel data for outputting, such as displaying or playing or providing access to, a private communication channel, similar to the channel 203 or 204 or 206 or 252 or 254, on the HMD 202. To illustrate, the one or more processors of the server system include, within the one or more image frames, private communication channel data to display, on the HMD 202, a private communication channel in which the virtual character C1 is performing the gesture n. In the illustration, upon receiving the private communication channel data, the one or more processors of the HMD 202 output, such as render or play or provide access to, the private communication channel data to provide the private communication channel on the one or more display screens of the HMD 202. As another illustration, the one or more processors of the server system include, within the one or more image frames, private communication channel data to display, on the HMD 202, a private communication channel from the standpoint of the virtual character C1 in which the virtual character C1 is making the gesture n. In the illustration, upon receiving the private communication channel data, the one or more processors of the HMD 202 render the private communication channel data to display the private communication channel on the one or more display screens of the HMD 202. As yet another illustration, one or more processors of the server system include, within the one or more image frames, private multimedia channel data for displaying, on the HMD 202, a private multimedia channel having an image of a speaker for providing access to private audio data to output sounds explaining the meaning n. In the illustration, upon receiving the private multimedia channel data, the one or more processors of the HMD 202 render the private multimedia channel data to display the private multimedia channel on the one or more display screens of the HMD 202. In the illustration, upon receiving a selection from the user 2 via the hand-held controller 204 of the image of the speaker, the one or more processors and the one or more speakers of the client device operated by the user 2 provide access, in the form of sounds, to the private audio data. In the illustration, the access is provided by controlling the one or more speakers of the client device operated by the user 2 to output the sounds based on the private audio data. In the illustration, the sounds provide the meaning n of the gesture n performed by the virtual character C1. As another illustration, one or more processors of the server system include, within the one or more image frames, private multimedia channel data for outputting a private multimedia channel having an image of the gesture n and an image of a speaker for access to private audio data to output sounds. In the illustration, upon receiving the private multimedia channel data, the one or more processors of the HMD 202 render the private multimedia channel data to display the private multimedia channel on the one or more display screens of the HMD 202 and upon receiving a selection of the image of the speaker control the one or more speakers of the client device operated by the user 2 to output the sounds.

It should be noted that each of the channels 203, 205, 206 (FIG. 2A), 252, and 254 provides a channel, such as a medium, of communication between the client device operated by the user 1 and the client device operated by the user 2. For example, the user 1 communicates with the user 2 via the client device operated by the user 1, the channel 203, 205, 206, 252, or 254, the computer network, and the client device operated by the user 2. In a similar manner, the user 2 can use the client device operated by the user 2 to initiate a private communication channel between the client device and the client device operated by the user 1 via the computer network. In a similar manner, a private communication channel is created between the client device operated by the user 1 or the user 2 and a client device operated by another user, who is a player of the video game.

FIG. 3 is a diagram of an embodiment of a system 300 to illustrate that one or more of the virtual gestures, such as the gestures 1 through n, made by the virtual character C1 are hidden from a user 3 after or simultaneously with an occurrence of a private communication channel, such as one of the channels 204, 203, 205, 252, and 254 (FIGS. 2A and 2B), between the users 1 and 2. The system 300 includes a client device, such as an HMD 302 and a hand-held controller 304, operated by the user 3. The HMD 302 is worn on a head of the user 3 and the hand-held controller 304 is held by one or both hands of the user 3. The user 3 uses the HMD 302 and the hand-held controller 304 to control the virtual character C3.

During a time period in which the virtual character C1 makes the virtual gesture 112 (FIG. 1), the one or more processors of the server system determine that the virtual gesture 112 (FIG. 1) is not directed towards the virtual character C3, and upon determining so, generate one or more image frames of a virtual gesture 307 of a virtual scene 306 and send the one or more image frames to the client device operated by the user 3 via the computer network. For example, upon determining that the virtual gesture 112 is directed towards the virtual character C2, the one or more processors of the server system determine that the virtual gesture 112 is not directed towards the virtual character C3. To illustrate, upon determining that the virtual character C1 is controlled by the user 1 via the hand-held controller 104 (FIG. 1) or the real-world gesture 110 or a combination thereof to bend down, move its hand behind its back, and form a peace sign with fingers of the hand, the one or more processors of the server system determine that the virtual gesture 112 is directed towards the virtual character C2 and not towards the virtual character C3. Also, in the illustration, upon determining that the virtual gesture 112 is directed towards the virtual character C2 and not towards the virtual character C3, the one or more processors of the server system determine that the real-world gesture 110 is directed towards the user 2 who controls the virtual character C2 and not towards the user 3 who controls the virtual character C3.

One or more processors of the client device operated by the user 3 receive the one or more image frames and render the one or more image frames to display the virtual gesture 307 of the virtual scene 306 on the HMD 302. The virtual scene 306 includes the virtual characters C1 and C2 except that the virtual character C1 makes the virtual gesture 307 in which its hands are in front of it body instead of behind. For example, during the same time period in which the one or more processors of the server system send the one or more image frames to display the virtual gesture 112 of the virtual scene 108 (FIG. 1) on the HMD 102 of the client device operated by the user 1, the one or more processors of the server system send the one or more image frames to display the virtual gesture 307 on the HMD 302 of the client device operated by the user 3. In the example, positions of the hands of the virtual character C1 as being behind the body of the virtual character C1 is hidden from the user 3 by displaying the positions of the hands to be in front of the body in the virtual gesture 307 of the virtual scene 306. The virtual gesture 307 hides the virtual gesture 112 performed by the virtual character C1 from being visible to the user 3 via the HMD 302.

In a similar manner, one or more of the additional virtual gestures, such as the gestures 2 through n, performed by the virtual character C1 under control of the user 1 via the hand-held controller 104 (FIG. 1) are hidden from the user 3. For example, during a time period in which the virtual character C1 makes one or more of the gestures 2 through n (FIG. 2A), the one or more processors of the server system generate one or more image frames of one or more additional virtual scenes and send the one or more image frames to the client device operated by the user 3 via the computer network. One or more processors of the client device operated by the user 3 receive the one or more image frames and render the one or more image frames to display the one or more additional virtual scenes on the HMD 302. The one or more additional virtual scenes displayed on the HMD 302 include the virtual character C1 or the characters C1 and C2 except that one or more of the gestures 2 through n performed by virtual character C1 are hidden from being displayed on the HMD 302. For example, during the same time period in which the one or more processors of the server system send one or more image frames to display one or more further virtual scenes on the HMD 102 (FIG. 1) of the client device operated by the user 1, the one or more processors of the server system send the one or more image frames to the client device operated by the user 3 to display the one or more additional virtual scenes on the HMD 302. In the example, the one or more processors of the server system hide one or more of the gestures 2 through n performed by the virtual character C1 from the user 3 in one or a variety of ways. To illustrate, the one or more processors of the server system hide one or more of the gestures 2 through n by overlaying one or more of the gestures 2 through n with an opaque image or by replacing one or more of the gestures 2 through n with another gesture or a combination thereof. In the example, upon receiving the one or more image frames from the server system, the client device operated by the user 3 displays the one or more additional virtual scenes with one or more of the gestures 2 through n that are hidden.

FIG. 4 is a diagram of an embodiment of a system 400 to illustrate components of a server system 402. The system 400 includes the server system 402, a client device 1, a client device 2, and a client device 3. The system 400 further includes a computer network 404. Examples of any of the client devices 1, 2, and 3 are provided above. To illustrate, the client device 1 includes the HMD 102 and the hand-held controller 104 (FIG. 1), the client device 2 includes the HMD 202 and the hand-held controller 204 (FIG. 2A), and the client device 3 includes the HMD 302 and the hand-held controller 304 (FIG. 3). The client device 1 is operated by the user 1, the client device 2 is operated by the user 2, and the client device 3 is operated by the user 3. Also, examples of the computer network 404 are provided above. The server system 402 includes the one or more processors and the one or more memory devices, and is an example of the server system, described above.

The server system 402 includes a gesture identifier 406, a character modifier 407, a private communication channel generator 408, and a gesture concealer 412. Each of the gesture identifier 406, the character modifier 407, the private communication channel generator 408, and the gesture concealer 412 is implemented in hardware or software or a combination thereof.

Examples of hardware include a processor, an application specific integrated circuit (ASIC), a field programmable gate array (FPGA), a programmable logic device (PLD), and a controller. To illustrate, the gesture identifier 406 is implemented as a first FPGA and the private communication channel generator 408 is implemented as a second FPGA. Examples of software include a computer program or a portion of a computer program. To illustrate, the gesture identifier 406 is a first computer software program executed by the one or more processors of the server system 402 and the private communication channel generator 408 is implemented as a second computer software program executed by the one or more processors of the server system 402. As an example, the controller includes one or more processors and one or more memory devices, and the one or more processors are coupled to the one or more memory devices.

The gesture identifier 406 is coupled to the private communication channel generator 408. The gesture identifier 406 is also coupled to the character modifier 407, which is coupled to the gesture concealer 412. The gesture identifier 406, the private communication channel generator 408, the character modifier 407, and the gesture concealer 412 are coupled to the client devices 1 through 3 via the computer network 404.

The gesture identifier 406 receives image data of the real-world gesture 110 from the client device 1 operated by the user 1 via the computer network 404 and identifies the real-world gesture 110. For example, the gesture identifier 406 determines that the real-world gesture 110 is a peace sign by comparing the image data of the real-world gesture 110 with one or more images, of one or more real-world gesture, that are pre-stored within the one or more memory devices of the server system 402, and determines that there is a match between the image data of the real-world gesture 110 and the one or more images. To illustrate, the gesture identifier compares one or more shapes of the one or more real-world gestures with a shape of the real-world gesture 110 to determine that the shape of the real-world gesture 110 is similar to, such as the same as, the one of the shapes of the one or more real-world gesture to further determine that the match occurs. As another example, the gesture identifier 406 is an AI model that is trained to determine that the real-world gesture 110 is similar to, such as having the same shape as that of, a predetermined number of real-world gestures indicating peace signs, to further determine that there is a probability that the real-world gesture 110 indicates a peace sign.

Upon identifying the real-world gesture 110, the gesture identifier 406 generates a gesture identification signal 414 and sends the gesture identification signal 414 to the character modifier 407. As an example, the gesture identification signal 414 includes the image data of the real-world gesture 110. Upon receiving the gesture identification signal 414, the character modifier 407 determines that the virtual character C1 is to be displayed as performing the gesture 1 based on the image data of the real-world gesture 110. Several manners in which the gesture 1 is associated with, such as determined based on the image data of, the real-world gesture 110 are described above with reference to FIG. 1.

The character modifier 407 further determines based on the gesture 1, that the gesture 1 is directed towards the virtual character C2 and not towards the virtual character C3 to generate a direction signal 418 including gesture data for displaying the gesture 1 and sends the direction signal 418 to the gesture concealer 412. For example, the direction signal 418 is sent to the gesture concealer 412 until a gaming session of the video game ends or until an indication of a selection is received from the user 1 via the hand-held controller 104 that further virtual gestures made by the virtual character C1 are not to be concealed. In the example, the direction signal 418 includes an indication that the gesture 1 is not directed towards the character C3 controlled by the user 3 via the hand-held controller 302 (FIG. 3). To illustrate, the gaming session ends when the user 1 ends the video game via the hand-held controller 102 or the user 2 ends the video game via the hand-held controller 202 or the user 1 logs off his/her user account 1 by using the hand-held controller 102 or the user 2 logs off his/her user account 2 by using the hand-held controller 202. Further, in the example, the gesture concealer 412 receives the indication that the further virtual gestures are not to be concealed from the client device 1 via the computer network 404. As another example, the character modifier 407 is or executes an AI model, such as an AI computer program, that is trained to identify that the virtual character C1 is to be controlled to make the virtual gesture 112 towards, such as in a direction of and meant for, the virtual character C2 in response to the reception of the image data indicating the real-world gesture 110. To illustrate, the AI model is provided with training data including positions of bodies, positions of hands relative to the positions of the bodies, and positions of fingers of the hands of a first set of virtual characters with respect to a second set of virtual characters and including indications that the first set of virtual characters are making virtual gestures towards the second set of virtual characters. In the further illustration, the AI model receives the virtual gesture 112 and compares the virtual gesture 112 with the positions of bodies, the positions of hands relative to the positions of the bodies, and the positions of fingers of the hands to determine that the virtual gesture 112 is similar to, such as the same as, the positions of hands with respect to the positions of the bodies and the positions of the fingers of the hands to determine that there is a probability that the virtual gesture 112 is directed from the virtual character C1 towards the virtual character C2. In the illustration, the AI model determines that the positions of the hands are similar to the virtual gesture 112 by identifying that the positions of the hands are behind the bodies. Moreover, in the illustration, the AI model determines that the positions of the fingers are similar to the virtual gesture 112 by determining that the positions have the same finger-crossing shapes as that of the virtual gesture 112. Upon determining the gesture 1, the character modifier 407 sends one or more image frames having gesture data to display the gesture 1 via the computer network 404 to the client device 1 or both the client devices 1 and 2.

Also, upon identifying the real-world gesture 110, the gesture identifier 406 sends the gesture identification signal 414 to the private communication channel generator 408. In response to receiving the gesture identification signal 414, the private communication channel generator 408 generates private communication channel data for displaying one or more private communication channels, such as one or more of the channels 203, 205, 206, 252, 256 (FIGS. 2A and 2B), on the client device 2. As an example, the private communication channel data, as described herein, includes multimedia data, such as audio data or image data or a combination thereof. To illustrate, the private communication channel data is an example of channel data described above. As another example, the private communication channel generator 408 is an AI model trained to generate the private communication channel data based on the real-world gesture 110. To illustrate, the private communication channel generator 408 is trained by providing to the private communication channel generator 408 multiple real-world gestures, similar in shape to the real-world gesture 110, and providing the private communication channel data consecutively with each of the real-world gestures. As yet another example, the private communication channel generator 408 embeds the image data, received within the gesture identification signal 414, or a textual description or a combination thereof of the real-world gesture 110 within the private communication channel data, accesses the user profile of the user 1 from the user account 1 to obtain the meaning 1 of the gesture 1 and embeds meaning data of the meaning 1 within the private communication channel data. The private communication channel generator 408 sends the private communication channel data via the computer network 404 to the client device 2 for display of the private communication channel data on the client device 2. Upon sending the private communication channel data, the private communication channel generator 408 generates a private communication channel signal 416 and sends the private communication channel signal 416 to the gesture identifier 406.

Also, upon receiving the direction signal 418 from the character modifier 407, the gesture concealer 412 generates concealing data to conceal, such as obfuscate or hide or overlay or replace, the gesture data of the gesture 1. An example of the concealing data is data that blurs a display of the gesture 1 or data that overlays an opaque block on the display of the gesture 1 or data that replaces the gesture 1 with another gesture. Also, the gesture concealer 412 conceals gesture data of the gesture 1 with the concealing data to generate concealed gesture data. Also, upon receiving the direction signal 418 indicating that the gesture 1 is not directed towards the virtual character C3 controlled by the user 3 via the client device 3, the gesture concealer 412 sends the concealed gesture data via the computer network 404 to the client device 3. Upon receiving the concealed gesture data, one or more processors of the client device 3 output, such as render, the concealed gesture data to conceal the gesture 1 from being displayed on the client device 3.

After receiving the private communication channel signal 416 and upon receiving image data of a further real-world gesture, made by the user 1, from the client device 1 operated by the user 1 via the computer network 404, the gesture identifier 406 identifies the further real-world gesture. For example, the gesture identifier 406 determines that the further real-world gesture is an extended index finger sign by comparing the image data of the further real-world gesture with one or more images, of one or more real-world gestures, that are pre-stored within the one or more memory devices of the server system 402, and determines that there is a match between the image data of the further real-world gesture and the one or more real-world gestures. To illustrate, the gesture identifier compares one or more shapes of the one or more real-world gestures with a shape of the further real-world gesture to determine that the shape of the further real-world gesture is similar to, such as the same as, the one of the shapes of the one or more gestures to further determine that the match occurs. As another example, the gesture identifier 406 is an AI model that is trained to determine that the further real-world gesture is similar to, such as having the same shape as that of, a predetermined number of real-world gestures indicating the extended index finger sign, to further determine that there is a probability that the further real-world gesture indicates the extended index finger sign.

Upon identifying the further real-world gesture, the gesture identifier 406 generates an additional gesture identification signal 420 and sends the additional gesture identification signal 420 to the character modifier 407. As an example, the additional gesture identification signal 420 includes the image data of the further real-world gesture. The character modifier 407 determines that the virtual character C1 is to be displayed as performing the gesture n based on the further real-world gesture. Several manners in which the gesture n is determined based on the further real-world gesture are described above with reference to FIG. 1. For example, the gesture identifier 406 determines that the gesture n is directed towards the virtual character C2 and not towards the virtual character C3 in the same manner in which the gesture identifier 406 determines that the gesture 1 is directed towards the virtual character C2 and not towards the virtual character C3. As another example, character modifier 407 does not determine whether the gesture n is directed towards the virtual character C2. To illustrate, the character modifier 407 accesses a private communication channel, such as the channel private communication channel 203 (FIG. 2A) to determine that the gesture n is included within the private communication channel 203. In the example, upon determining that the gesture n is included within the private communication channel 203, the character modifier 407 assumes that the gesture n is directed towards the virtual character C2 and not towards the virtual character C3. Upon determining the gesture n based on the further real-world gesture, the character modifier 407 generates a direction signal 422 and sends the direction signal 422 to the gesture concealer 412. The direction signal 422 includes image data of the gesture n and an indication that the gesture n is directed towards the virtual character C2 and not towards the virtual character C3. The character modifier 407 also sends one or more image frames including the image data of the gesture n via the computer network 404 to the client device 2 or both the client devices 1 and 2 to display the gesture n.

Also, upon identifying the further real-world gesture as being associated with, such as having a one-to-one relationship with or a unique relationship with, the gesture n of the virtual character C1, the gesture identifier 406 sends the additional gesture identification signal 420 to the private communication channel generator 408. In response to receiving the additional gesture identification signal 420, the private communication channel generator 408 generates private communication channel data for displaying one or more private communication channels, similar to one or more of the channels 203, 205, 206, 252, 256 (FIGS. 2A and 2B), on the client device 2. As an example, the private communication channel generator 408 is an AI model trained to generate the private communication channel data based on the further real-world gesture. To illustrate, the private communication channel generator 408 is trained by providing to the private communication channel generator 408 image frames of multiple real-world gestures, similar in shape to the further real-world gesture, and providing the private communication channel data consecutively with image frames of each of the real-world gestures. As yet another example, the private communication channel generator 408 embeds the image data, received within the gesture identification signal 420, or a textual description or a combination thereof of the further real-world gesture within the private communication channel data, accesses the user profile of the user 1 from the user account 1 to obtain the meaning n of the gesture n and embeds meaning data of the meaning n within the private communication channel data. The private communication channel generator 408 sends the private communication channel data via the computer network 404 to the client device 2 for display of the private communication channel data on the client device 2. Upon sending the private communication channel data, the private communication channel generator 408 generates another private communication channel signal 424 and sends the private communication channel signal 424 to the gesture identifier 406.

Moreover, upon receiving the direction signal 422 from the character modifier 407, the gesture concealer 412 generates concealing data to conceal the gesture n. An example of the concealing data is data that blurs a display of the gesture n or data that overlays an opaque block on the display of the gesture n or data that replaces the gesture n with another gesture. Also, the gesture concealer 412 conceals gesture data of the gesture n with the concealing data to generate concealed gesture data. Also, upon receiving the direction signal 422 indicating that the gesture n is not directed towards the virtual character C3 controlled by the user 3 via the client device 3, the gesture concealer 412 sends the concealed gesture data via the computer network 404 to the client device 3. Upon receiving the concealed gesture data, one or more processors of the client device 3 output, such as render, the concealed gesture data to conceal the gesture n from being displayed on the client device 3. For example, the virtual character C1 is displayed on the client device 3 as performing a different gesture than the gesture n.

It should be noted that the real-world gesture 110 is associated with the meaning 1 and the further real-world gesture is associated with the meaning n. For example, the gesture 1 is determined based on the real-world gesture 110 and the meaning 1 is determined based on the gesture 1 to associate the real-world gesture 110 with the meaning 1. As another example, the gesture n is determined based on the further real-world gesture and the meaning n is determined based on the gesture n to associate the further real-world gesture with the meaning n.

Figure 5:
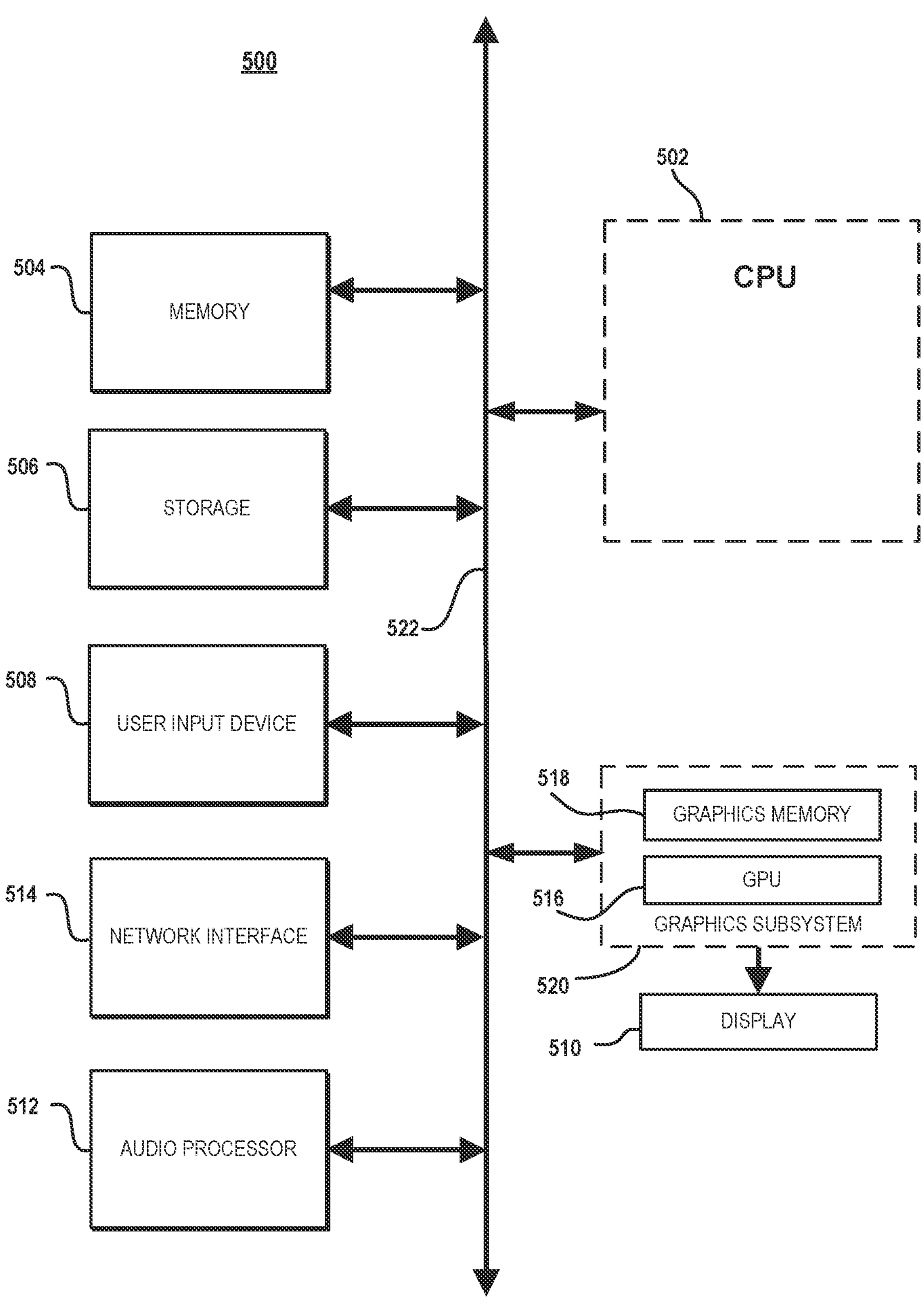
FIG. 5 illustrates components of an example device that can be used to perform aspects of the various embodiments of the present disclosure.

FIG. 5 illustrates components of an example device 500, such as a client device or a server system, described herein, that can be used to perform aspects of the various embodiments of the present disclosure. This block diagram illustrates the device 500 that can incorporate or can be a personal computer, a smart phone, a video game console, a personal digital assistant, a server or other digital device, suitable for practicing an embodiment of the disclosure. The device 500 includes a CPU 502 for running software applications and optionally an operating system. The CPU 502 includes one or more homogeneous or heterogeneous processing cores. For example, the CPU 502 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. The device 500 can be a localized to a player, such as a user, described herein, playing a game segment (e.g., game console), or remote from the player (e.g., back-end server processor), or one of many servers using virtualization in a game cloud system for remote streaming of gameplay to clients.

A memory 504 stores applications and data for use by the CPU 502. A storage 506 provides non-volatile storage and other computer readable media for applications and data and may include fixed disk drives, removable disk drives, flash memory devices, compact disc-ROM (CD-ROM), digital versatile disc-ROM (DVD-ROM), Blu-ray, high definition-DVD (HD-DVD), or other optical storage devices, as well as signal transmission and storage media. User input devices 508 communicate user inputs from one or more users to the device 500. Examples of the user input devices 508 include keyboards, mouse, joysticks, touch pads, touch screens, still or video recorders/cameras, tracking devices for recognizing gestures, and/or microphones. A network interface 514 allows the device 500 to communicate with other computer systems via an electronic communications network, and may include wired or wireless communication over local area networks and wide area networks, such as the internet. An audio processor 512 is adapted to generate analog or digital audio output from instructions and/or data provided by the CPU 502, the memory 504, and/or data storage 506. The components of device 500, including the CPU 502, the memory 504, the data storage 506, the user input devices 508, the network interface 514, and an audio processor 512 are connected via a data bus 522.

A graphics subsystem 520 is further connected with the data bus 522 and the components of the device 500. The graphics subsystem 520 includes a graphics processing unit (GPU) 516 and a graphics memory 518. The graphics memory 518 includes a display memory (e.g., a frame buffer) used for storing pixel data for each pixel of an output image. The graphics memory 518 can be integrated in the same device as the GPU 516, connected as a separate device with the GPU 516, and/or implemented within the memory 504. Pixel data can be provided to the graphics memory 518 directly from the CPU 502. Alternatively, the CPU 502 provides the GPU 516 with data and/or instructions defining the desired output images, from which the GPU 516 generates the pixel data of one or more output images. The data and/or instructions defining the desired output images can be stored in the memory 504 and/or the graphics memory 518. In an embodiment, the GPU 516 includes three-dimensional (3D) rendering capabilities for generating pixel data for output images from instructions and data defining the geometry, lighting, shading, texturing, motion, and/or camera parameters for a scene. The GPU 516 can further include one or more programmable execution units capable of executing shader programs.

The graphics subsystem 514 periodically outputs pixel data for an image from the graphics memory 518 to be displayed on the display device 510. The display device 510 can be any device capable of displaying visual information in response to a signal from the device 500, including a cathode ray tube (CRT) display, a liquid crystal display (LCD), a plasma display, and an organic light emitting diode (OLED) display. The device 500 can provide the display device 510 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (Saas). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a GPU since it will be doing a large number of relatively simple mathematical operations (e.g., matrix transformations). Other game engine segments that require fewer but more complex operations may be provisioned with a processing entity associated with one or more higher power CPUS.

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and an input/output (I/O) interface. The client device can be a personal computer (PC), a mobile phone, a netbook, a personal digital assistant (PDA), etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device system, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In an embodiment, although the embodiments described herein apply to one or more games, the embodiments apply equally as well to multimedia contexts of one or more interactive spaces, such as a metaverse.

In one embodiment, the various technical examples can be implemented using a virtual environment via the HMD. The HMD can also be referred to as a virtual reality (VR) headset. As used herein, the term "virtual reality" (VR) generally refers to user interaction with a virtual space/environment that involves viewing the virtual space through the HMD (or a VR headset) in a manner that is responsive in real-time to the movements of the HMD (as controlled by the user) to provide the sensation to the user of being in the virtual space or the metaverse. For example, the user may see a three-dimensional (3D) view of the virtual space when facing in a given direction, and when the user turns to a side and thereby turns the HMD likewise, the view to that side in the virtual space is rendered on the HMD. The HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on the HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, compact disc-read only memories (CD-ROMs), CD-recordables (CD-Rs), CD-rewritables (CD-RWs), magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

It should be noted that in various embodiments, one or more features of some embodiments described herein are combined with one or more features of one or more of remaining embodiments described herein.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A computer-implemented method performed by one or more processors in communication with client devices including at least one gesture-capturing camera, comprising:

receiving, from the camera, image data of a real-world gesture made by a user and identifying the real-world gesture;

determining that the real-world gesture is directed towards a subset of users from a plurality of users in a virtual environment;

initiating, automatically and in response to determining that the real-world gesture is directed towards the subset of users, one or more private communication channels between the user and the subset of users;

generating one or more virtual gestures corresponding to the real-world gesture, wherein the one or more virtual gestures are associated with one or more meanings;

outputting the one or more meanings visually or audibly to the subset of users within the one or more private communication channels; and outputting the one or more virtual gestures in the virtual environment to the subset of users while hiding the one or more virtual gestures from remaining users using a concealment mechanism that modifies output to the client devices of the remaining users by overlaying, replacing, or obscuring the one or more virtual gestures in the virtual environment such that the virtual gestures are visible in the virtual environment only to the subset of users.

2. The method of claim 1, wherein said determining that the real-world gesture directed towards the subset of users from the plurality of users in the virtual environment includes:

determining that a virtual character controlled by the user makes one or more virtual gestures in the virtual environment directed towards one or more virtual characters in the virtual environment controlled by the subset of users from a plurality of virtual characters controlled by the plurality of users; and determining that the virtual character controlled by the user does not direct the one or more virtual gestures in the virtual environment towards remaining ones of the plurality of virtual characters in the virtual environment.

3. The method of claim 1, wherein initiating, automatically and in response to determining that the real-world gesture is directed towards the subset of users, one or more private communication channels between the user and the subset of users includes:

initiating a first private communication channel between a client device operated by the user and a client device operated by a first one of the subset of users; and initiating a second private communication channel between the client device operated by the user and a client device operated by a second one of the subset of users.

4. The method of claim 1, wherein said outputting the one or more virtual gestures in the virtual environment to the subset of users in the virtual environment includes:

generating image data for displaying one or more images within one or more private communication channels on one or more client devices operated by the subset of users, wherein the one or more images include fields for receiving descriptions of one or more virtual gestures; or generating audio data for outputting sounds via the one or more client devices operated by the subset of users; or a combination thereof.

5. The method of claim 1, wherein said determining that the real-world gesture is directed towards a subset of users from a plurality of users in a virtual environment includes:

determining that a virtual character controlled by the user makes one or more virtual gestures in the virtual environment, the virtual gestures corresponding to the real-world gesture, and the one or more virtual gestures are directed towards one or more virtual characters controlled by the subset of users from a plurality of virtual characters controlled by the plurality of users; and initiating, automatically, the one or more private communication channels between the user and the subset of users in response to an indication that the virtual gesture of the user is directed towards the one or more virtual characters of the subset of users.

6. The method of claim 1, wherein each of the user and the plurality of users play a video game in the virtual environment via a plurality of client devices.

7. A server system comprising:

a processor configured to perform operations comprising:

receiving, from a camera, image data of a real-world gesture made by a user and identifying the real-world gesture;

determining that the real-world gesture is directed towards a subset of users from a plurality of users in a virtual environment;

initiating, automatically and in response to determining that the real-world gesture is directed towards the subset of users, one or more private communication channels between the user;

generating, within the one or more private communication channels, one or more virtual gestures corresponding to the real-world gesture, wherein the one or more virtual gestures are associated with one or more meanings;

outputting the one or more meanings visually or audibly to the subset of users within the one or more private communication channels; and outputting the one or more virtual gestures to the subset of users in the virtual environment while hiding the one or more virtual gestures from remaining users using a concealment mechanism that modifies output to one or more client devices of the remaining users by overlaying, replacing, or obscuring the one or more virtual gestures in the virtual environment such that the virtual gestures are visible only to the subset of users in the virtual environment; and a memory device coupled to the processor.

8. The server system of claim 7, wherein to determine that the real-world gesture directed towards a subset of users from the plurality of users in a virtual environment, the processor is configured to:

determine that a virtual character controlled by the user makes one or more virtual gestures in the virtual environment directed towards one or more virtual characters in the virtual environment controlled by the subset of users from a plurality of virtual characters controlled by the plurality of users; and determine that the virtual character controlled by the user does not direct the one or more virtual gestures in the virtual environment towards remaining ones of the plurality of virtual characters in the virtual environment.

9. The server system of claim 7, wherein initiating, automatically and in response to determining that the real-world gesture is directed towards the subset of users, the one or more private communication channels between the user and the subset of users, the processor is configured to:

initiating a first private communication channel between a client device operated by the user and a client device operated by a first one of the subset of users; and initiating a second private communication channel between the client device operated by the user and a client device operated by a second one of the subset of users.

10. The server system of claim 7, wherein the processor is further configured to:

generate image data for displaying one or more images within one or more private communication channels on one or more client devices operated by the subset of users, wherein the one or more images include fields for receiving descriptions of one or more virtual gestures; or generate audio data for outputting sounds via the one or more client devices operated by the subset of users;

or a combination thereof.

11. The server system of claim 7, wherein the processor is further configured to:

determine that a virtual character controlled by the user makes one or more virtual gestures in the virtual environment, the one or more virtual gestures corresponding to the real-world gesture, and that the one or more virtual gestures are directed towards one or more virtual characters in the virtual environment controlled by the one or more users from a plurality of virtual characters controlled by the plurality of users; and initiating, automatically, the one or more private communication channels between the user and the subset of users in response to an indication that the virtual gesture of the user is directed towards the one or more virtual characters of the subset of users.

12. The server system of claim 7, wherein to hide the one or more virtual gestures from the remaining users, the processor is configured to conceal the one or more virtual gestures from being output via one or more client devices operated by the remaining users.

13. The server system of claim 7, wherein each of the plurality of users play a video game in the virtual environment via a plurality of client devices.

14. A non-transitory computer-readable medium containing program instructions for facilitating private communication between users, wherein execution of the program instructions by one or more processors of a computer system causes the one or more processors to carry out operations of:

receiving, from a camera, image data of a real-world gesture made by a user and identifying the real-world gesture:

determining that the real-world gesture is directed towards a subset of users from a plurality of users in a virtual environment;

initiating, automatically and in response to determining that the real-world gesture is directed towards the subset of users, one or more private communication channels between the user;

generating one or more virtual gestures corresponding to the real-world gesture, wherein the one or more virtual gestures are associated with one or more meanings;

outputting the one or more meanings visually or audibly are output to the subset of users within the one or more private communication channels; and outputting the one or more virtual gestures to the subset of users in the virtual environment while hiding the one or more virtual gestures from remaining users using a concealment mechanism that modifies output to one or more client devices of the remaining users by overlaying, replacing, or obscuring the one or more virtual gestures in the virtual environment such that the virtual gestures are visible in the virtual environment only to the subset of users.

15. The non-transitory computer-readable medium of claim 14, wherein the operation of determining that the real-world gesture is directed towards the subset of users from the plurality of users in the virtual environment includes:

determining that a virtual character controlled by the user makes one or more virtual gestures in the virtual environment, the one or more virtual gestures corresponding to the real-world gesture, and that the one or more virtual gestures are directed towards one or more virtual characters in the virtual environment controlled by the subset of users from a plurality of virtual characters controlled by the plurality of users; and determining that the virtual character controlled by the user does not direct the one or more virtual gestures in the virtual environment towards remaining ones of the plurality of virtual characters in the virtual environment.

16. The non-transitory computer-readable medium of claim 14, wherein the operation of initiating, automatically and in response to determining that the real-world gesture is directed towards the subset of users, the one or more private communication channels includes:

initiating a first private communication channel between a client device operated by the user and a client device operated by a first one of the subset of users; and initiating a second private communication channel between the client device operated by the user and a client device operated by a second one of the subset of users.

17. The non-transitory computer-readable medium of claim 14, wherein the operation of generating the one or more virtual gestures corresponding to the real-world gesture includes:

generating image data for displaying one or more images with the one or more private communication channels of one or more client devices operated by the one or more users, wherein the one or more images include fields for receiving descriptions of one or more virtual gestures, wherein the one or more virtual gestures include the one or more additional gestures; or generating audio data for outputting sounds via the one or more client devices operated by the one or more users; or a combination thereof.

* * * * *